May 25, 1948.  J. L. BOYER ET AL  2,442,262
CYCLOCONVERTER CONTROL
Filed April 5, 1947                    2 Sheets-Sheet 1

INVENTORS
John L. Boyer &
Charles Gordon Hagensick.
BY O. B. Buchanan
ATTORNEY

May 25, 1948.   J. L. BOYER ET AL   2,442,262
CYCLOCONVERTER CONTROL
Filed April 5, 1947   2 Sheets-Sheet 2

INVENTORS
John L. Boyer &
Charles Gordon Hagensick.
BY O. B. Buchanan
ATTORNEY

Patented May 25, 1948

2,442,262

UNITED STATES PATENT OFFICE 2,442,262

CYCLOCONVERTER CONTROL

John L. Boyer and Charles Gordon Hagensick, Wilkinsburg, Pa., assignors to Westinghouse Electric Corporation, East Pittsburgh, Pa., a corporation of Pennsylvania Application April 5, 1947, Serial No. 739,724

20 Claims. (Cl. 172—281)

Our invention relates to rectifier and inverter converters consisting of a plurality of groups of specially controlled tubes, and tube-circuits therefor. While certain features of our invention are of more general application, our invention was designed particularly for an electronic frequency-changer known as a cycloconverter, and it was still more particularly designed for supplying power from a higher-frequency input-circuit, generally of a constant frequency, and generally polyphase, to a lower-frequency load-circuit which may be either single-phase or polyphase, and which may or may not have a variable frequency. The direction of the power-flow may also be reversed.

A cycloconverter comprises two groups of tubes for each phase of the output-frequency, and both groups of tubes are so controlled that they are capable of acting alternately as rectifiers and inverters, thus going through cycles of rectification and inversion, hence the name "cycloconverter."

The tubes are preferably either hot-cathode gas-filled tubes, or ignitrons, or other tubes having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode; the tube, when fired, having a tendency to remain conducting, independent of the control-element, until the anode becomes less positive than the cathode. The control-element may be a control-grid; or, in the case of an ignitron, the control-element may be either a control-grid or an ignitor.

A principal object of our present invention is to overcome a deficiency which has been existent in certain previously known cycloconverters, which have heretofore been so controlled that the group of tubes which produces the positive half-waves of output-voltage have been permitted to be in the rectifying condition during an overlapping part of the periods during which the tube-group producing the negative half-waves of output-voltage are rectifying. This circumstance has caused a high circulating current to flow between the two tube-groups, amounting to a short-circuit on the input-frequency supply-circuit, with a current which is limited substantially only by the reactances of the power-supply transformers of the converter, and such other reactances as are included in the converter-circuit. This condition has resulted in an undesirably large number of faults, or failures of the tubes to properly commutate these heavy circulating currents.

It is an important feature of our present invention to so control the tubes that each group of tubes is permitted to rectify for considerably less than 180 electrical input-frequency degrees, so that there will be at least a certain predetermined time-interval, or a certain number of electrical degrees, existing as an interval between the moment when no more tubes of a rectifying group are permitted to fire, for rectifying operation, and the time when the first tube of the other group of that pair of groups is permitted to be fired in a rectifying direction.

Further objects of our invention relate to certain improved control-circuits, featured by a common modulator-frequency variable-bias means, which is common to all of the tubes of all of the cycloconverter-groups, and comprising a common cathode-circuit, a negative bias-voltage source, and a single-pole rotating-commutator bias-reducing means, for periodically reducing the negative grid-bias at the desired modulator-frequency of the output-circuit.

In the preferred forms of embodiment of our invention, the foregoing and other novel features and purposes are superimposed upon the electronic frequency-changer which is described and claimed in our copending application, Serial No. 739,723, filed April 5, 1947, in which each tube-controlling circuit of the cycloconverter includes four serially connected voltages, or their equivalent, namely, a negative direct-current bias-voltage, a modulator-frequency alternating voltage, preferably square-topped, and two input-frequency voltages, preferably peaked, these two input-frequency voltages being of different magnitudes, the smaller one being timed or phased for controlling the initiation of the rectifying operation of the cycloconverter-tubes, while the larger peaked voltage is phased for controlling the inverter operation.

With the foregoing and other objects in view, our invention consists in the circuits, combinations, systems, methods, apparatus and parts, hereinafter described and claimed, and illustrated in the accompanying drawing, wherein:

Figure 1:
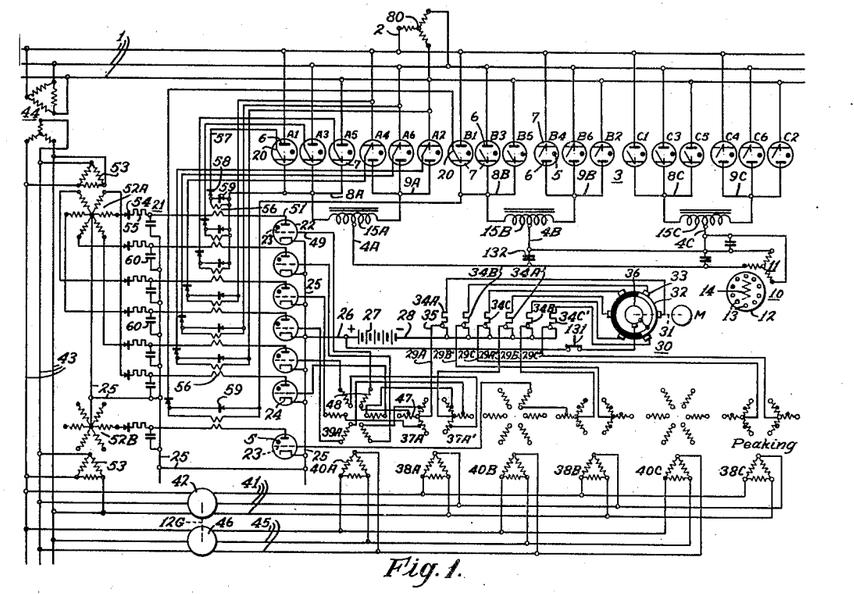
Figures 1 to 3 are simplified diagrammatic views of circuits and apparatus, illustrative of three different forms of embodiment of our invention, each utilizing a three-phase input-circuit and a cycloconverter connected thereto for supplying a three-phase output-circuit.

In Fig. 1, we show a 3-phase input-circuit 1, which is energized from a generator 2. An eighteen-tube cycloconverter 3 is utilized to couple the input-circuit 1 to a 3-phase output-circuit 4A, 4B and 4C, having a frequency lower than the input-circuit.

The supply-circuit 1 may be a constant-frequency 60-cycle system, or any other alternating-current supply-system, usually polyphase, while the output-circuit 4A, 4B, 4C may either be of a constant frequency, such as a 25-cycle system, or it may be of a variable frequency, which may be controlled.

While we refer to the supply and load circuits 1 and 4A, etc., as input and output circuits, respectively, we wish it to be understood that the direction of power-flow is reversible, so that power may be interchanged in either direction between these two circuits, the words "input" and "output" being utilized merely as a matter of convenience, to refer to circuits which ordinarily serve as the input and output circuits, respectively, in most applications of our invention.

Each of the main power-tubes 3 may be either a hot-cathode gas-filled tube or an ignitron, having a suitable control-electrode. In the drawing, a tiny circle or dot 5 has been placed within the diagrammatic representation of each of these tubes, as a convention for indicating the presence of gas or vapor, or other means for causing the control-electrode of the tube to become ineffective, in general, to stop the firing of the tube, once the firing has been initiated.

The main anode-cathode circuits of the cycloconverter-tubes may be arranged or connected in any of the ways known for rectifiers and inverters, either single-phase or polyphase, and for any desired number of phases. In the form of embodiment of our invention which is shown in Fig. 1, the cycloconverter-tubes 3 are arranged in six groups numbered A1, A3, A5; A4, A6, A2; B1, B3, B5; B4, B6, B2; C1, C3, C5; and C4, C6, C2. The letters A, B and C of this nomenclature correspond to the three phases of the output-circuits 4A, 4B and 4C. The numbers correspond to the phase-numbers of a 6-phase system of vectors of the input-frequency.

The positive groups of cycloconverter-tubes 3 are those bearing odd numbers, such as the tubes A1, A3 and A5, for example, which supply the positive half-waves of the phase-A output-current for the output-conductor 4A. These tubes are called the positive tubes because their anodes 6 are connected to the respective phase-conductors of the three-phase input-circuit 1. The mercury cathodes 7 of these positive tubes are connected to a common cathode-circuit 8A. The corresponding cathode-circuits for the other output-phases are designated 8B and 8C, respectively.

The so-called negative tubes 3 of the cycloconverter are designated by even numbers, such as the tubes A4, A6 and A2, which supply the negative halves of the output-currents in their respective output-phases, such as the output-phase 4A. The cathodes 7 of each of these negative tubes are connected to the respective phase-conductors of the 3-phase input-circuit 1, while the anodes 6 of said negative tubes are connected to common anode-conductors 9A, 9B and 9C, respectively, for the three output-phases 4A, 4B and 4C.

As will be explained later on, each group of tubes, either positive or negative, is capable of supplying substantially the entire voltage-wave of the output-phase to which it is connected. When the output-current is at unity displacement-factor, the positive half-waves of current are drawn from the positive tubes, through rectifier action, and the negative half-waves of the current are drawn from the negative tubes, also through rectifier action. However, an important characteristic feature of our cycloconverter is that the output-current does not need to be at unity displacement-factor, and when this is the case, the output-current is not in phase with the output-voltage, so that the part of the current which is out of phase with the voltage is supplied partly by rectifier action, and partly by inverter action.

This circumstance will be explained more in detail, with reference to wave-form diagrams, in the subsequent explanation of the mode of operation of the invention. It is mentioned, here, to emphasize the fact that when we refer to positive tubes and negative tubes, we use the terms "positive" and "negative" only as a convenience, to refer to currents which are considered to be positive or negative at any particular moment. It should be borne in mind, however, that each cycloconverter-tube 3 is capable of supplying both the positive and negative halves of the output-voltage wave, by reason of the control-circuit voltage which is supplied to each tube, as each cycloconverter-tube 3 is capable of operating either as a rectifier or as an inverter.

The 3-phase output-circuit 4A, 4B, 4C of Fig. 1 as illustrated as being utilized to energize a variable-speed 3-phase motor 10, which may be either an induction motor or a synchronous motor. It is illustrated as having a 3-phase primary winding 11, which is the stator winding of the machine, and it has a rotor 12 which is provided with a squirrel-cage secondary or damper winding 13, and it may or may not have a direct-current exciting-winding 14, which may be suitably controlled by automatic or manual means (not shown), as is well understood in the art of synchronous-motor operation.

Fig. 1 shows a novel method and means for transferring power from the positive and negative groups of cycloconverter-tubes to the several output-phases 4A, 4B and 4C, and this particular method and means constitutes the subject-matter of a copending application of John L. Boyer, Serial No. 739,725, filed April 5, 1947.

The means for transferring power from the cycloconverter-groups to the load-circuit 4A, 4B and 4C is the same for each phase, so that a description of the means for one phase will suffice for all three. As shown in Fig. 1, this power-transfer means, for phase A, is in the form of a paralleling reactor 15A, which has a midtap which is connected to the corresponding output-phase 4A. The terminals of the paralleling reactor 15A are connected respectively to the cathode-bus 8A of the corresponding positive group of tubes, and the anode-bus 9A of the corresponding negative group of tubes. The paralleling reactors for the other two output-phases are designated 15B and 15C respectively.

In Fig. 1, the control-electrodes of the cycloconverter tubes 3 are illustrated as being the ignitors 20 of the several tubes. The exciting currents for the several ignitors, as illustrated, are supplied, by a known form of exciter-circuit, indicated generally by the numeral 21, from eighteen gas-filled auxiliary or exciter-tubes 22, only seven of which are shown in Fig. 1, the rest having been omitted in order to avoid unnecessary complication of the diagram. Thus, we have illustrated the six auxiliary tubes 22 for exciting the ignitors of the six phase-A cycloconverter-tubes A1, A3, A5; A4, A6, A2, referring to the output-phase A of the output-circuit conductor 4A. The cycloconverter-tubes of the remaining two phases are similarly controlled, the nature of the control being indicated only for the first tube, B1, of the second output-phase, to show the nature of the connections.

The ignitor-energizing tubes 22 have control-grids 23 which are controlled in a novel manner. The cathodes 24 of all eighteen exciter-tubes 22 are connected to a common cathode-circuit or bus 25, to which is connected a grid-control circuit 26 which includes a negative-bias battery 27, and a conductor 28 which then branches into six branch control-circuits 29A, 29A', 29B, 29B', 29C and 29C'. One of these branch control-circuits is utilized for the grids 23 of the ignitor-energizing tubes 22 for the three cycloconverter tubes 3 of each of the six groups of cycloconverter-tubes. The control-circuit branches for the positive cycloconverter-groups are not primed, and control-circuit branches for the negative cycloconverter-groups are primed.

Each of the control-circuit branches 29A, etc., includes a source of a square-topped modulator-wave voltage, phased according to the desired output-phases 4A, 4B and 4C, to supply both the positive and negative halves of the output-phases. It is a feature of our present invention that we utilize a control-circuit including a common cathode-circuit 25—26; and hence our modulator-wave circuit, for each cycloconverter-group, (such as the tubes A1, A3, A5), may be a single-pole rotating-commutator bias-controlling means.

Figure 2:
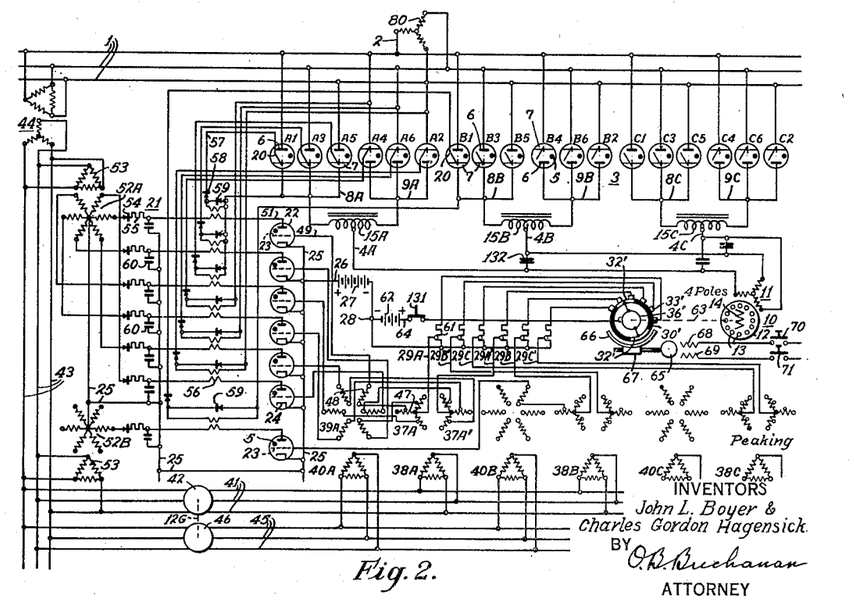
Figure 3:
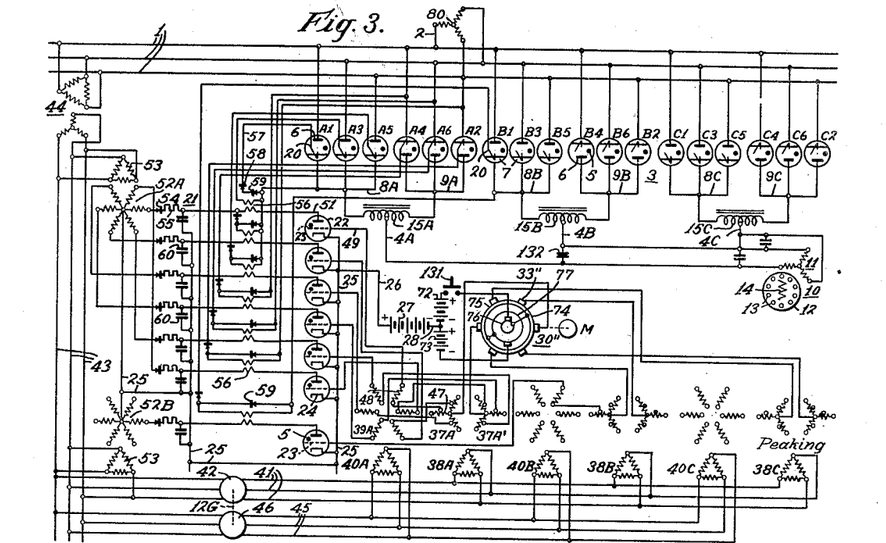

This single-pole rotating-commutator bias-controlling means may take various forms, as shown in Figs. 1, 2 and 3. In Fig. 1, it comprises a rotating commutator 30, mounted on a shaft 31 which is driven at the synchronous speed corresponding to the desired output-frequency of the output-circuit 4A, 4B, 4C, as by means of a motor M. The commutator 30 has one conducting commutator-segment 32, or one segment for each 360 electrical degrees; and this segment, in accordance with our present invention, has a circumferential extent which is materially less than 180 electrical degrees, as will be subsequently explained in detail. Bearing on the commutator 30 are six commutator-brushes 33 which are spaced by the number of electrical degrees corresponding to twice the number of phases of the output-circuit 4A, 4B, 4C, twice because both positive and negative wave-halves are supplied. In Fig. 1, since the output-circuit is three-phase, there are six commutator-brushes 33, spaced 60 electrical degrees apart.

The six commutator-brushes 33 are serially connected, through resistors 34A, 34A', 34B, 34B', 34C and 34C', respectively, to the negative terminal 28 of the negative-bias battery 27. The resistors 34A, etc., have intermediate potentiometer-taps 35, which are connected to the respective branch-circuits 29A, etc. The commutator-segment 32, is connected, through a slip-ring 36, to the positive terminal 26 of the negative-bias battery 27, so that the six potentiometers 34A, etc., serve to periodically reduce the negative bias which is effective in the respective branch-circuits 29A, etc., at the times when the respective potentiometers are energized by their respective commutator-brushes 33.

Continuing the description of the grid-control branch-circuits 29A, 29A', 29B, 29B', 29C and 29C', as shown in Fig. 1, it will be noted that the two branch-circuits 29A and 29A', for controlling the positive and negative tubes of the output-phase A, are connected to the midpoints of two groups of 3-phase-star-connected secondary windings 37A and 37A', which are energized from a group of 3-phase-connected primary windings 38A of three single-phase peaking-transformers, for supplying the grid-controlling voltage-peaks for controlling the rectifier-operation of the corresponding cycloconverter-tubes 3. The corresponding phases of the rectifier-peaker windings 37A and 37A' are connected to the proper phases of a group of open-star 6-phase-connected secondary windings 39A which are excited by a group of 3-phase-connected primary windings 40A of three single-phase peaking-transformers for supplying the grid-controlling voltage-peaks for the inverter-operation of the respective cycloconverter-tubes 3.

The corresponding peaking-transformers for the output-phase B are indicated at 38B and 40B. The corresponding peaking-transformers for the third phase C are indicated at 38C and 40C.

The three groups of "rectifier" peaking-transformers 38A, 38B and 38C are illustrated as being excited from a 3-phase input-frequency circuit 41, the phase of which is controlled by means of a phase-shifter 42 which is excited from an auxiliary input-frequency circuit 43, energized, through an auxiliary power-transformer 44, from the 3-phase input-circuit 1 of the cycloconverter. The three groups of "inverter" peaking-transformers 40A, etc., are excited from a 3-phase input-frequency circuit 45, which is energized, by a phase-shifter 46, from the auxiliary input-frequency circuit 43.

Each of the six sets of peaking-transformer secondaries, such as 37A and 39A, subdivides its branch control-circuit, such as 29A, into as many separate circuits as the number of main tubes 3 in each cycloconverter-group, such as A1, A3 and A5. Each cycloconverter-tube 3 thus receives its proper phase-control, through its assigned firing-controlling tube 22.

Tracing the grid-control circuit for controlling the first cycloconverter-tube A1, for example, and starting with the branch-circuit conductor 29A, it will be noted that the rectifier-peaker winding 47, having a phase corresponding to the voltage-phase which is supplied to the main tube A1, is connected in series with the inverter-peaker phase 48, which preferably lags 120° behind the winding 47, although the relative phases may be controlled, to a nicety, by the respective phase-shifters 42 and 46. The output-terminal of the inverter-peaker phase 48 is connected to the grid-circuit 49 of the auxiliary tube 22 which excites the ignitor 20 of the cycloconverter-tube A1.

The ignitor-circuits of the cycloconverter-tubes 3 in Fig. 3 are energized from the anode-circuits 51 of the respective auxiliary tubes 22. These anode-circuits are energized from a set of 6-phase star-connected secondary windings 52A, 52B, etc., of exciter-transformers which are illustrated as having 3-phase primary windings 53, energized from the auxiliary input-frequency bus 43.

The anode-circuit 51 of each of the auxiliary tubes 22 includes a rectifier 54 for delivering only the positive half-waves of the energizing-transformer phase, a current-limiting resistor 55, and the primary winding of an insulating transformer 56, the secondary winding of which excites the ignitor-circuit 57, through a rectifier 58 which supplies only the positive peaks to the ignitor. A return-path for the flux-decay current of the insulating transformer 56 is provided, in a known manner, by means of a rectifier 59 which is connected across the transformer-secondary.

The energy-source for each of the anode-circuits 51 of the auxiliary or exciting tubes 22 also includes an energy-storing capacitor 60 which is connected in shunt across the anode-circuit, at a point between the resistor 55 and the insulating transformer 56. The capacitor 60 assists in delivering a strong peak-current to the ignitor-circuit when the auxiliary tube 22 becomes conducting. The current-limiting resistor 55 controls the rate at which the capacitor 60 is charged, during the positive half-cycles of the anode-voltage which is applied to the tube 22, and the resistor 55 also serves to limit the amount of current which is drawn from the transformer-windings 52A, etc., when the auxiliary tube 22 becomes conducting.

Fig. 2 shows a different form of embodiment of the modulator-frequency control-circuit means which is connected, at 26, to the cathode-circuit 25 of the auxiliary or firing-control tubes 22. There are several good forms of embodiment of this modulator-frequency control. In Fig. 2, we utilize the same negative-bias battery 27 as in Fig. 1, but we utilize different means for connecting the branched control-circuits 29A, 29A', 29B, 29B', 29C and 29C' to the negative terminal 28 of the aforesaid negative-bias battery 27. In Fig. 2, the six branch-circuits 29A, etc., are connected to the negative-terminal 28 of the bias-battery 27, through six resistors 61, each branch-circuit having a separate resistor. In Fig. 2, for periodically reducing the negative bias, at the modulator-frequency, a positive-polarity direct-current bias-voltage source, such as a battery 62, is utilized, in connection with a modulator-frequency commutator 30' for periodically impressing the positive voltage of the battery 62 across successive resistors 61 of the several branch-circuits 29A, 29B', etc.

In Fig. 2, the modulator-frequency commutator 30' is shown as being driven from the shaft 63 of the output-circuit motor 10, which is illustrated, by way of example, as a motor having 4 poles, as indicated by legend in Fig. 2. This direct commutator-driving connection 62 is possible because the motor 10 is a synchronous motor. The commutator member 30' is, therefore, a 4-pole commutator, having twice 360, or 720, electrical degrees in its complete circumference. The commutator 30' therefore has two, diametrically opposite, conducting commutator-segments 32', each of materially less than 180 electrical degrees. The six commutator-brushes 33', in Fig. 2, are spaced 60 electrical degrees apart, as explained in connection with Fig. 1.

The slip-ring 36' of the commutator 30', in Fig. 2 connects the two conducting segments 32' to the positive terminal 64 of the positive biasing-battery 62, and the negative terminal of this positive biasing-battery 62 is connected to the negative terminal 28 of the main negative-bias battery 27. Thus, whenever one of the commutator-brushes 33' makes contact with either one of the conducting segments 32', it reduces the negative bias of the battery 27 by the voltage of the battery 62, thus reducing the negative bias which is impressed upon the several branch control-circuits 29A, etc.

In Fig. 2, where the modulator-frequency commutator 30' is driven by the synchronous output-circuit motor 10, the frequency of the output-circuit 4A, 4B, 4C can be varied by advancing or retarding the commutator-brushes 33', which may be done by means of a pilot-motor 65 which rotates the brushholder-rockerring 66, through a worm-gear connection 67. The pilot-motor 65 may be driven in either direction by means of two field-windings 68 and 69 of opposite polarity, either one of which may be energized by suitable control-means, either manual or automatic, symbolically indicated by push buttons 70 and 71.

In Fig. 3, we show a still further modification of the modulator-frequency control, utilizing the same negative-bias battery 27, but having a direct-current auxiliary bias-voltage source having an intermediate tap which is connected to the negative terminal 28 of said negative bias-battery 27. This auxiliary bias-voltage source is shown symbolically in the form of two auxiliary batteries 72 and 73, the first one having its negative terminal connected to the conductor 28, while the battery 73 has its positive terminal connected to the conductor 28.

The rotating modulator-frequency commutator 30'', in Fig. 3, is provided with two insulated, electrically conducting commutator-segments 74 and 75, the first one being of considerably less than 180 electrical degrees in extent, while the segment 75 has a length of considerably more than 180 electrical degrees. The commutator-brushes 33'' are spaced 60 electrical degrees apart, as before. The two commutator-segments 74 and 75 are connected, through slip-rings 76 and 77, respectively, to the positive terminal of the battery 72 and the negative terminal of the battery 73, respectively.

The operation of our invention will best be understood with reference to the curve-diagrams of Figs. 4 to 8.

Figures 4, 5:
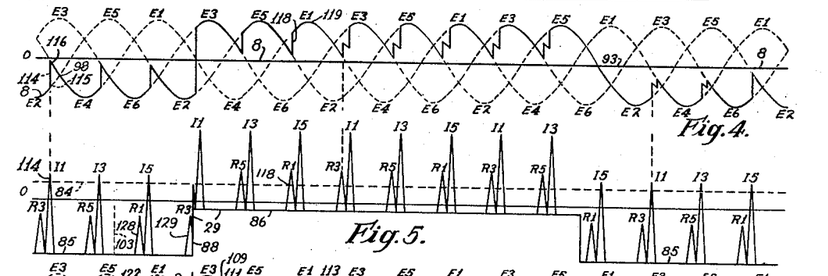
Figs. 4 to 8 are curve-diagrams illustrative of the operations of the invention.
Figures 6, 7, 8:
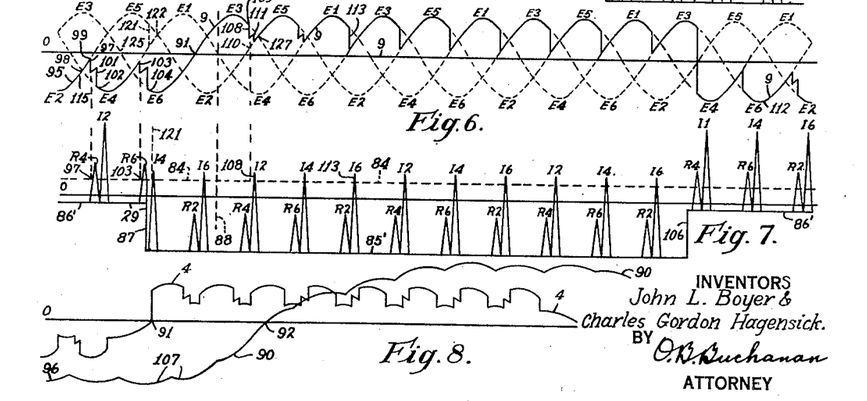

Figs. 4 and 6 show the three sinusoidal voltages, E1—E4, E3—E6, and E5—E2, which are supplied to the main anode-cathode circuits of the cycloconverter-tubes 3 from the input-circuit 1 of Figs. 1, 2 or 3; the zero-voltage line 0 of Figs. 4 and 6 being the neutral-voltage, such as the generator neutral-voltage 80. The positive halves of the voltage-waves have the odd numbers, as E1, E3, E5; while the negative halves have the even numbers, as E4, E6, E2.

In Fig. 4, the heavy-line curve 8 shows substantially the voltage of the cathode-bus, such as the cathode-bus 8A, of one of the so-called positive groups of cycloconverter-tubes, such as the tubes A1, A3, A5 of Figs. 1, 2 or 3, this voltage being plotted with respect to the neutral-point 80.

In Fig. 6, the heavy-line curve 9 shows substantially the voltage of the anode-bus, such as 9A, of one of the so-called negative groups of cycloconverter-tubes, such as the tubes A4, A6, A2 of Figs. 1, 2 or 3, this voltage being again plotted with respect to the neutral-point 80.

The voltage of the corresponding output-circuit conductor 4A of Figs. 1, 2 or 3, or the midpoint of the paralleling reactor 15A, is substantially the average of the voltages represented by the heavy-line curves 8 and 9 of Figs. 4 and 6; the output-frequency voltage-drops in the two halves of the paralleling reactor 15A being relatively small, except during the moments when the output-voltages 8 and 9 of the positive and negative tube-groups are not equal, resulting in the flow of circulating currents in the paralleling reactor. This output-voltage is shown at 4 in Fig. 8.

In Fig. 5 are shown all of the resultant voltages which are supplied to the three control-circuits of the auxiliary tubes 22 controlling the three positive-voltage tubes A1, A3 and A5 in Figs. 1, 2 or 3. The zero-potential line 0 in Fig. 5 represents the potential of the common control-circuit cathode-bus 25 of Figs. 1, 2 or 3. The voltage of the control-circuit conductor 29A of Figs. 1, 2 or 3, with respect to the common control-circuit cathode-bus 25, is represented by the square-topped wave-form marked 29 in Fig. 5. The positive peaks of the three rectifier-firing transformer-secondaries 37A are indicated at R1, R3 and R5 in Fig. 5, and the positive peaks of the three corresponding serially connected phases of the inverter-firing secondary-windings 39A are indicated at I1, I3 and I5 in Fig. 5.

The negative peaks of the control-voltages which are applied to the respective firing-controlling tubes 22 of Figs. 1, 2 and 3 have been omitted, in Fig. 5, because they are immaterial, as the grid-circuits are effective to fire the several firing controlling-tubes 22 only when the respective grids reach a voltage which is more positive than a certain critical grid-potential, such as is represented by the dotted horizontal line 84 in Fig. 5.

It will be understood that the control-circuit of each of the grid-firing tubes, such as the top tube 22 which is associated with the cycloconverter-tube A1, receives only the correspondingly numbered peaks R1 and I1 of its own circuit.

Fig. 7 shows the corresponding output-frequency-modulated grid-bias 29' of the control-circuit conductor 29A' of Figs. 1, 2 and 3, and also the rectifier-firing and inverter-firing peaks R4, R6, R2, and I4, I6, I2, which are applied to the grid-circuits of the respective firing-controlling tubes 22 which are associated with the cycloconverter-tubes A4, A6 and A2 of Figs. 1, 2 or 3.

It will be noted, from Figs. 5 and 7, that the rectifier-firing peaks R1, etc., are smaller than the inverter-firing peaks I1, etc., and that the square-topped output-frequency-modulated wave 29 or 29' alternates, at the modulator-frequency, between time-periods of unequal length, in which the modulated grid-bias voltage is alternately high and low. The periods 85 and 85', during which the modulator-frequency grid-base voltage has the more negative value, are longer than the periods 86 and 86' during which the modulator-frequency grid-base voltage has the more positive (or less negative) value.

It will be further noted that the more negative periods 85 and 85' of the modulated grid-bias have such a tube-controlling voltage as to prevent the rectifying-controlling peaks R1, R2, etc., from making the total grid-voltage sufficiently positive to reach the critical grid-voltage 84 which is necessary to initiate the firing of the corresponding auxiliary tube 22, and through it, to initiate the firing of the associated cycloconverter tube A1, A2, etc.; but this more negative modulated grid-bias 85 or 85' is not sufficiently negative to block the inverting-controlling operation of the cycloconverter-tubes, because the inverting peaks I1, I2, etc., are sufficiently strong to extend up above (or more positive than) than the critical grid-voltage 84.

On the other hand, the less negative (or more positive) modulated grid-base voltage 86 or 86' is sufficiently positive so that it does not block either the rectifier-controlling peaks R1, R2, etc., or the inverter-controlling peaks I1, I2, etc., thus permitting both sets of peaks to fire their respective tubes, if the tube-anodes are sufficiently positive with respect to the tube-cathodes, at the moment.

It is an important feature of our present invention that the length or time-duration of the rectification-permitting periods 86 or 86' of Figs. 5 and 7 shall be substantially less than 180 electrical degrees of the output-frequency. It is also essential that the time-period between the end, 87, of a rectification-permitting period 86' (Fig. 7) of one group, say A4, A6, A2, of a pair of groups of cycloconverter-tubes, and the beginning, 88, of the next rectification-permitting period 86 (Fig. 5) of the other group, such as A1, A3, A5, shall be sufficiently long, when measured in terms of the input-frequency, to provide satisfactory operation, as will now be explained.

If the ratio between the output-frequency and the input-frequency is variable, this time-period 87—88, when measured in output-frequency degrees, should be adequate under the extreme conditions of the highest ratio of output-frequency to input-frequency.

In a converter-circuit having a three-phase input to the main tubes, as shown in Figs. 1, 2 and 3, it is necessary to have a period 87—88 of at least 60 input-frequency degrees in which the output-frequency modulator does not permit rectification in either group, and it is usually desirable to provide a somewhat larger time-interval, in order to provide a suitable margin to allow for inaccuracies in the control-circuits. If the main circuits of the converter-tubes were energized for six-phase operation, a time-period 87—88 of at least 120 input-frequency degrees would be required.

The reason for these various requirements will best be understood by a detailed consideration of the operation of the converter, with reference to the curves shown in Figs. 4 to 8.

To determine the operation of the cycloconverter-tubes, it is necessary to know the amount and the polarity of the instantaneous value of the output-current at any moment. In Fig. 8, a lagging output-current is assumed, by way of illustration, as shown by the curve 90. This output-current 90 lags the output-voltage 4 approximately by the output-frequency phase-angle represented by the distance between the voltage-zero 91 and the current-zero 92, or the output-frequency angle between the voltage-zero 93 and the current-zero 94.

At the first moment shown in Figs. 4 to 8, it is assumed, for example, that the converter-tube A2 is carrying current as a rectifier, as shown by the beginning 95, of the negative-group voltage-curve 9 in Fig. 6. It must be remembered that the voltage-curve 9 in Fig. 6 represents the anode-voltage of the tube which is carrying current at the moment. The current, at this moment, is negative, as shown by the beginning, 96, of the current-curve 90 in Fig. 8, thus indicating that the current is flowing from the output-circuit 4A to the input-circuit 1, at the moment. While the negative-voltage tube A2 is carrying current as a rectifier, its anode-voltage 95 (Fig. 6) is substantially the same as the voltage E2 which is impressed upon its cathode, because the voltage-drop within the tube is small, as compared to the operating-voltage of the tube.

The negative-voltage tube A2 continues to carry the current 96, through rectifier-action, until the next tube A4 of the negative group A4, A6, A2 is fired, which happens when the rectifier-peak R4, in Fig. 7 attains the critical grid-voltage 84, as indicated by the point 97. This point occurs after the crossing-point 98 of the voltage-waves E2 and E4. At the point 97, the instantaneous voltage of the common anode-circuit 9A of the newly firing tube A4 is the same as the anode-voltage of the previously rectifying tube A2, as shown at 99 in Fig. 6. At the same time, the cathode-voltage of the tube A4, which is just being fired, is the instantaneous value of the impressed voltage-wave E4, as indicated at 100 in Fig. 6. This analysis thus shows that the tube A4, which is just being fired, has its anode-voltage 99 more positive than its cathode-voltage 100, at the instant 97 when the starting-impulse is applied to its control-electrode. This satisfies the conditions necessary for firing the tube A4.

A certain commutating time thereupon ensues, as represented by the horizontal distance between the vertical lines 97 and 101, in Fig. 6. During this commutating time, the current is commuted, or changed, from the tube A2 to the tube A4. The length of this commutating time depends upon the amount of current which has to be commutated at that particular moment, the reactance of the supply-generator 2, and the voltage-difference 99—100 between the circuits being commutated. The voltage of the anode-circuit 9A of Figs. 1, 2 or 3 thereupon changes substantially to the voltage E4 which is supplied to the tube A4, as indicated by the portion, 102, of the heavy curve 9 in Fig. 6.

Soon after the rectifying-firing peak R4 of the tube A4 occurs, as shown in Fig. 7, the inverting-firing peak I2 of the tube A2 occurs, but the tube A2 does not fire at this point, because its cathode-voltage E2, as shown in Fig. 6, is more positive than its anode-voltage which is shown by the portion 102, of the heavy-line curve in Fig. 6.

Thereafter, the rectifying action is changed over to the next tube A6 of the negative group, at the point 103, and the output-voltage becomes substantially the voltage of the impressed voltage-wave E6, as shown at 104.

Before the time comes for the rectifier-peak R2 of the next negative-voltage tube A5, the modulated grid-bias 29', in Fig. 7, changes from its rectification-permitting value 86', to its blocking-value 85', at the moment indicated at 87 in Fig. 7. This moment 87 thus marks the moment after which none of the negative-group tubes A4, A6 or A2 will receive an effective rectification-starting firing-impulse R4, R6 or R2, of sufficient strength to reach the critical firing-voltage 84; and this rectification-blocking condition endures as long as the modulated-bias curve 29' has its maximum negative value as shown at 85', in Fig. 7. This blocking-period endures from the point 87 to the point 106 in Fig. 7. In accordance with our invention, this rectification-blocking period should be considerably longer than 180 output-frequency degrees. In Fig. 7, the blocking-period is shown, by way of illustration, as enduring for approximately 210 output-frequency degrees. This means that the duration of the rectification-permitting periods 86 and 86', in Figs. 5 and 7, is approximately 150 output-frequency degrees, in the particular case which we have chosen for illustration in the drawing.

Since there is no immediately following rectifying-impulse to change the current from the rectifying tube A6 to either of the other tubes A2 or A4 of the negative group, after the tube A6 begins rectifying, as indicated by the portion, 104, of the voltage-line in Fig. 6, and since a negative current continues to be drawn by the load, as indicated by the portion, 107, of the load-current curve 90 in Fig. 8, the negative-voltage tube A6 continues to carry current, as a rectifier, until the voltage-zero point 91 is reached, in Fig. 6, after which the tube still continues to carry current, through inverter-action, during a portion of the positive half of the voltage-wave, which is shown at E3 in Fig. 6. This action continues until the inverter-firing peak I2 attains a sufficiently positive value, as indicated by the point 108 in Fig. 7, at which an inverter-operation firing-impulse is applied to the negative-group tube A2, at a point when the anode-voltage 109 of the tube is more positive than the cathode-voltage 110, thus transferring the current from the tube A6 to the tube A2, in the commutating-time 108—111.

This commutating action, with inverting operation of the negative-group tubes A6, A2 and A4, continues until the load-current becomes zero, as indicated by the point 92 in Fig. 8, at which point the negative group of tubes A4, A6 and A2 ceases to carry inverter-current. The negative group of tubes thereafter ceases to carry current, until the next current-zero 94 (Fig. 8), when the rectifying action of this group of tubes recommences, as shown by the portion, 112, of the heavy-line voltage-curve in Fig. 6.

During the period 92—94 (Fig. 8) when the negative tube-group A4, A6, A2 is not carrying load-current, its respective tubes are still being fired, whenever their respective rectifier-firing peaks R4, R6, R2, or their inverter-firing peaks I4, I6, I2, become more positive than the critical grid-voltage 84, at a time when the anode-voltage of the tube is more positive than the cathode-voltage. Since the tubes of this negative group are not carrying current during this period 92—94 in Fig. 6, the commutating-times become zero, resulting in substantially instantaneous transfer of the firing-condition from one tube to the next, as shown, for example, at 113 in Fig. 6, which represents the first firing-time during the no-load operation 92—94 of the negative tube-group, when the inverter-firing peak I6, in Fig. 7, reaches the critical grid-voltage 84. During this entire no-load period 92—94, the negative tube-group A4, A6, A2 thus produces an output-voltage wave-portion, and it stands ready to deliver any current which may be demanded.

The operation of the positive group of tubes, A1, A3 and A5 of Figs. 1, 2 or 3, will be more or less apparent, from the foregoing description, upon reference to Figs. 4 and 5, remembering that the heavy line 8, in Fig. 4, represents substantially the cathode-voltage of the cathode-bus 8A, while the voltage-waves E1, E3 and E5 represent the voltages which are impressed upon the respective anodes of the tubes of the positive group. No tube of the positive group will fire unless the instantaneous value of its output-voltage, as represented by the heavy line 8 in Fig. 4, is more negative than the instantaneous value of the impressed voltage-wave E1, E3 or E5, as the case may be, in Fig. 4.

Thus, let us consider the conditions when the first inverter-firing impulse occurs in Fig. 5, at the moment 114 when the inverter-peak I1 becomes sufficiently positive to exceed the critical grid-voltage 84, so as to apply a firing-impulse to the tube A1 of the positive-group, while the negative group of tubes is carrying a rectifying current 96 (Fig. 8). At this instant 114, when an inverter-firing impulse is applied to the tube A1, the cathode-voltage of the tube is practically the same as the impressed voltage-wave E2 on the previously inverting tube A5, as indicated by the point 115 on the heavy-line curve 8 in Fig. 4, while the anode-voltage of the tube A1 is the value of the impressed voltage-wave E1—E4, at the moment, or the value 116 (Fig. 4).

It will be noted that the tube A1, at this inverter-firing moment 114, in Fig. 4, thus has an anode-voltage 116 which is more positive than the cathode-voltage 115, so that the tube A1 fires during its inverter operation, producing an output-voltage and standing ready to deliver a load-current in case the phase of the load-current 90, in Fig. 8, were such as to require positive current at this moment. Under the conditions which are assumed, for illustrative purposes, in the drawing, the load-current 90 (Fig. 8) is negative, at this moment 114, as shown at 96, and hence, except for a brief peak of circulating current, as subsequently described, the positive-voltage tube A1 does not actually carry current, during the inverter-period of its operation, during the negative half, E4, of the voltage-wave E1 which is impressed upon this tube.

Under the conditions shown in the drawing, the first load-carrying operation of the positive group of tubes occurs substantially at the moment when the load-current changes from a negative to a positive value, as shown by the point 92 in Fig. 8. At this instant, as shown in Fig. 4, the tube A1 is receiving an excitation-current, which is supplied from the first or topmost ignitor-firing auxiliary tube 22 in Figs. 1, 2 and 3. This excitation-current has been flowing in the tube A1 since the moment 118 when the rectifying-firing impulse was applied to the corresponding auxiliary tube 22, as indicated by the moment 118 (Fig. 5) when the rectifying peak R1 reaches the critical grid-voltage 84 in Fig. 5.

Consequently, at the current-zero 92, the tube A1 begins carrying current as a rectifier, and supplies, to the output-circuit, the voltage 119 (Fig. 4) of the voltage-wave E1 which is being applied to the tube A1 at the moment. The operation thereafter continues as already explained.

Referring to Fig. 6, the angular distance, in input-frequency degrees, between the rectifying-firing point 97 and the preceding 3-phase voltage-crossing point 98 of Fig. 6, (assuming 3-phase rectifier-operation, as in Figs. 1, 2 and 3), is called the delay-angle for the rectifier-peak R4, or the rectifying delay-angle. In like manner, the phase or time-delay, expressed in terms of input-frequency degrees, between the inverter-firing point 121 of the same tube and the same voltage-crossing point 98, is called the delay-angle for the inverter-peak I4, or the inverter delay-angle.

There is a phenomenon which is dependent upon the relation between the rectifier delay-angle 98—97, in Fig. 6, and the inverter-advance-angle 121—122, where 122 is the next voltage-crossing point, 180° after the crossing-point 98. The inverter advance-angle 121—122 is equal, of course, to 180° minus the inverter delay-angle 98—121. These two angles 98—97 and 121—122 are interdependent, because a peak of reactor-current flows, from one terminal 9A to the other terminal 8A, through the midtapped paralleling reactor 15A, from the rectifier tubes to the inverter tubes, at each of the voltage-crossing points, 98, 122, etc., for the successive phases.

Let us consider, for example, the voltage-differences which exist between the output-voltages 8 and 9 of the positive and negative tube-groups, just before and after the voltage-wave crossing-point 98 in Figs. 4 and 6. At the point 114 in Fig. 4, the positive-group voltage 8 changes from the value 115 to the value 116, in Fig. 4, while the negative-group voltage 9 remains at the value 115, as shown by Fig. 6, resulting in a positive half of a peak of circulating-current flowing from terminal 8A to terminal 9A through the paralleling reactor 15A in Fig. 1. At the voltage-wave crossing-point 98, the two output-voltages 8 and 9 are equal, but a certain amount of flux is stored up in the paralleling reactor 15A.

If the rectifying delay-angle 98—97 of the negative tube-group, in Fig. 6, is smaller than the inverting phase-lead 114—98 of the positive tube-group, in Fig. 4, the negative or flux-reducing portion of the circulating-current peak would not have a sufficient time-integrated value to demagnetize the iron of the paralleling reactor 15A of Fig. 1, resulting in a certain progressive unidirectional increase in current in the paralleling reactor, at successive voltage-wave crossing-points. There would thus be continuous circulating-current in the paralleling reactor, and the reactor-current peaks would reach a larger value than they would have, if the iron of the reactor had become demagnetized at each current-peak. These increased reactor-current peaks would be superimposed upon a direct-current component in the reactor. The harmonics and the power factor of the input-currents which are drawn from the input-circuit 1 would be deleteriously affected.

If the rectifying delay-angle 98—97 is made approximately equal to the inverter advance-angle 114—98, as approximately shown in Figs. 4 and 6, the circulating reactor-current, barring voltage-distortions in the theoretically sinusoidal wave E2 of the previously operating inverting-tube A5, will have approximately equal positive and negative halves, so that there will be no progressive unidirectional increase in current in the paralleling reactor 15A. This circulating reactor-current will then consist of a series of brief, disconnected, unidirectional peaks. The magnitude of these reactor-current peaks is a measure of the amounts of harmonics and lagging current which are drawn from the input-circuit 1 of the cycloconverter, even when the output-circuit of the converter is supplying a load-current at unity displacement-factor.

It is frequently desirable, as a factor of safety, or to provide for the contingency of a certain amount of distortion in the input-voltage waveform, to have the rectifying phase-lag 98—97 greater than the inverting phase-lead 114—98, as a safeguard to insure against a continuous direct-current component in the paralleling reactor 15A. A means is thus afforded, as described and claimed in a copending application of John L. Boyer, Serial No. 739,725, filed April 5, 1947, whereby the input wave-form and power-factor may be somewhat improved, at the expense of a very slight reduction in the output-voltage, if desired.

The effective magnitude of the output-voltage with respect to the input-voltage may be varied, from a maximum to zero, by increasing the rectifying delay-angle 98—97 from the smallest reasonable value to approximately 90°, or approximately the time represented by the horizontal distance 98—125 in Fig. 6, and simultaneously reducing the inverting delay-angle 98—121, preferably in approximately the same amount, or from 98—121 to 98—125. If the rectifying and inverting phase-angles are changed in equal amounts in opposite directions, when either one is changed, the two phase-shifters 42 and 46 may be mechanically coupled together, with one of them connected in the opposite phase-sequence with respect to the other, as had been indicated in Figs. 1, 2 and 3, wherein the two phase-shifters 42 and 46 are shown as being mounted on a common control-shaft 126.

The minimum practicable inverting advance-angle 114—98 (Fig. 4), and hence the minimum practicable rectifying delay-angle 98—97 (Fig. 6), is of the order of 12 to 30 degrees. The limit is reached when the end of the inverting delay-angle, such as 98—121 (Fig. 6), approaches so closely to the voltage-crossing point 122 (Fig. 6) for that phase, that the end of the inverting commutating-angle, such as is shown, for a different phase, at 108—111, will approach toward the next voltage-wave crossing-point 127, with an insufficient margin of safety.

It is necessary for a certain deionizing time to occur, between the point when the inverter-commutation has been completed, as indicated at 111 in Fig. 6, and the next voltage-crossing point 127, to allow the inverting tube to become deionized. In other words, referring to the tube A6 which was inverting before the commutating operation 108—111, it is necessary for this commutating operation to be completed, so as to make said tube nonconducting, a certain finite time before the next voltage-crossing point 127 is reached, that is, before the anode-voltage, E2—E5, of the next-fired tube A2 (which will also be the anode-voltage of the previously inverting tube A6), becomes positive with respect to the cathode-voltage E3—E6, of the previously inverting tube A6. The space within said previously firing tube A6 must first become deionized.

The duration of the inverter commutating-time, such as 108—111 of Fig. 6, is dependent upon the out-of-phase load-current at the moment, the voltage-difference between the circuits being commutated, and the commutating reactance of supply-generator 2 of Figs. 1, 2 and 3. If this reactance is low, a larger inverting delay-angle 108—111 may be used with the same load-current, and still have a long enough deionizing-time before the 180° crossing-point 127 is reached.

An important feature of our present invention is that the positive and negative groups of a pair of groups of tubes are not permitted to rectify at the same time. Referring to Fig. 6, the last negative-voltage tube to rectify, during the first rectification period of the negative group of tubes, is the tube A6, as shown by the portion, 104, of the heavy-line curve in Fig. 6. This tube may remain rectifying from the firing-point 103 to the next voltage-zero 91, provided that the load-current is sufficiently lagging, in power factor, to demand a negative current-wave until this voltage-zero point 91 is reached.

It should be noted that the rectification-period 86' of Fig. 7 could have ended at any time in relation to the input-frequency degrees, so that it could have ended at the rectifying firing-point 103 of this tube A6, which means that the rectification-blocking point 87 of Fig. 7 could have occurred at the time 103.

If the positive-group rectification-period 86 (Fig. 5) had been permitted to commence simultaneously with the discontinuance of the negative-group rectification-period 86' (Fig. 7), then the points 88 and 87 would both have coincided with each other, and, under the conditions just assumed, the points 88 and 87 would have coincided with the point 103, on the horizontal time-scale of Figs. 4 to 7. The first positive-group tube to be fired, for rectifying action, after the point 103, would then be the positive-group tube A1, as shown by the R1 firing-peak 128 in Fig. 5, and this action would occur 60 input-frequency degrees after the termination of the negative-group rectification-period at the point 103, which is the R6 firing-point. If the positive-voltage tube R1 were permitted to fire at the R1 firing-point 128, the resultant firing-action of the positive-voltage tube A1 would occur during a part of the period 103—91 (Fig. 6) during which the negative-voltage tube A6 would or could be firing, resulting in a large circulatory current, directly through the paralleling reactor 15A, from the positive-voltage tube A1 to the negative-voltage tube A6.

In order to prevent this simultaneous rectification-action, it is necessary to provide a time-lag interval of at least 60 input-frequency degrees, between the termination 87 (or 103) of the negative-group firing-period 86' in Fig. 7, and the initiation 88 of the positive-group rectification-period 86 in Fig. 5. With this minimum non-rectification interval of 60 input-cycle degrees, as provided by our invention, the first positive-group tube which could fire, after the firing of the negative-group tube A6, would be the positive-group tube A3, which would not fire until the point 129, which is after the voltage-zero 91 which terminates the longest possible rectifying-action of the negative-group tube A6.

While the immediately preceding discussion has had to do with 3-phase converter-operation, in which the successive voltage-waves are 120° apart, as shown in Figs. 6 and 8, the same principles would apply to 6-phase operation, with the understanding that the voltage-wave crossing-point, with respect to which the rectifying and inverting delay-angles are measured, would be the crossing-point of six sinusoidal waves, spaced 60° apart, rather than three sinusoidal waves, spaced 120° apart.

When the output-circuit of the cycloconverter is utilized to energize a motor 10 which is provided with a damper winding or short-circuited squirrel-cake secondary winding 13, as shown in Figs. 1, 2 and 3, experience has shown that the motor is quite capable of performing satisfactorily on an output-wave-form having strong harmonics in it, either when the harmonics result from the blocked or square-topped form of the output-voltage of the cycloconverter, in the output-circuit 4A, 4B, 4C of Figs. 1, 2 and 3, or when the harmonics result from ripples which produce harmonics in the output-voltage wave. This is so, because the motor damping-winding 13 substantially blocks the harmonics from the wave-form of the flux of the motor, resulting in only a moderate increase in the heating of the motor because of the harmonics in the voltage which is supplied to the motor.

When the displacement-factor of the load on the output-circuit 4A, 4B, 4C of Fig. 1, 2 or 3 is substantially unity, and can be maintained surely at unity, without risk of having any substantial wattless-current component, then it is not necessary for the inverter-controlling peakers to be used in our control-circuits, such as are shown at 40A—39A in Figs. 1, 2 and 3, and these inverter-controlling peakers could then be either omitted entirely, or cut out of circuit during the unity-displacement-factor operation. As covered by our aforementioned copending application, the inclusion of these inverter-controlling peakers makes it possible to supply an output-circuit load which is not at unity displacement-factor, either during the motor-starting period, or under fault-conditions, or even during normal operating-conditions.

A feature of our present invention is that our novel control-circuit arrangement makes is readily possible to easily stop rectification in all of the cycloconverter-tubes 3, without removing the inverting firing impulses. This may readily be done by including a rectification-controlling switch 131 in the single-pole modulator-frequency bias-reducing circuit, in each of Figs. 1, 2 and 3, so as to make it impossible for the rotating-commutator 30, 30' or 30'' to reduce the negative biasing-voltage to the point where the rectification peaks R1, R2, etc., can make the resultant grid-voltage attain the critical firing-value 84. Thus, in Fig. 1, the rectification-controlling switch 131 is connected in series between the positive battery-terminal 26 and the commutator slip-ring 36; in Fig. 2, the switch 131 is connected in series with the auxiliary battery 62; while in Fig. 3, the switch 131 is connected in series with the auxiliary battery 72.

As described and claimed in the previously mentioned Boyer application, we sometimes utilize load-circuit capacitors 132, connected in parallel across the three-phase output-circuit 4A, 4B, 4C, in each of Figs. 1, 2 and 3. Parallel-connected load-circuit capacitors have been known before, in other converter-combinations, but they are particularly useful in combination or cooperation with the paralleling output-circuit reactors 15A, 15B and 15C. These reactors have to have a certain amount of input-frequency reactance, in order to limit the amount of fault-current which could flow, from terminal to terminal through the reactor, in the event of a fault on any one of the cycloconverter-tubes. When such a tube-fault occurs, a heavy short-circuit or fault-current circulates through the reactor, from one group to the other group of pair of groups of cycloconverter-tubes, thus imposing a short-circuit on one or both of the alternating-current systems.

It is necessary for the paralleling reactor 15A, etc., to have sufficient input-frequency reactance to limit this circulating short-circuit current to a value which can be commutated by the tubes, so that the next good tube will clear the momentary fault which occurred in the faulted tube. The faulted tube may have time to recover before it is called upon to carry current again, during its next operating-period in the cycle of operations.

A high reactance of the paralleling reactors 15A, 15B and 15C is undesirable, however, in the output-circuit 4A, 4B, 4C, because it reduces the load-circuit displacement-factor, and it also makes the voltage-regulation worse, that is, it makes the output-voltage droop more, as the load-current increases from zero to its maximum value. The amount of output-frequency reactance of each half of each of the paralleling reactors 15A, 15B and 15C can be reduced by reducing the ratio between the output-frequency and the input-frequency, that is, by applying the invention to applications having an output-frequency which is relatively low with respect to the input-frequency.

In this combination, the output-circuit capacitors 132 serve a doubly useful purpose, in not only correcting the adverse displacement-factor effect of the paralleling reactors 15A, 15B and 15C, in the output-circuit, but also filtering out some of the voltage-ripples from the output-circuit. The effect of the reactance of the paralleling reactors 15A, 15B and 15C, in series with the load, is to dampen out some of the ripples, and the effect of the parallel-connected capacitors 131 is to also filter out the ripples, while counteracting the bad displacement-factor effect of the paralleling reactors. Thus the reactor-capacitor combination constitutes a means for controlling and improving the output wave-form.

An advantage of the paralleling reactors 15A, 15B and 15C is that they are independent of each other, so that the load-current harmonics do not reflect from one phase to another.

While we have illustrated and explained our invention in its application to but a single type of circuit-connection for the main anode-cathode circuits of the cyclo-converter-tubes, and while we have illustrated and explained only three specific embodiments of control-circuits, as shown in Figs. 1, 2 and 3, we wish it to be understood that our invention is not limited to the application, or to the specific control-circuits, which we have chosen for illustration, nor are we limited to our explanation of our present understanding of the theory and operation of our invention. We desire, therefore, that the appended claims shall be accorded the broadest construction consistent with their language.

We claim as our invention:

1. An electronic converter comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; each group of tubes having a common output-terminal; and control-circuit excitation-means for exciting the control-circuits of the respective tubes, said control-circuit excitation-means including means for producing a control-voltage modulation at the input-frequency, and means for producing a control-voltage modulation at a modulator-frequency which is less than said input-frequency, said modulator-frequency voltage-modulation having a substantially square-topped wave-form and substantially unequal high-voltage and low-voltage periods, the periods of the higher negative modulator-frequency voltages being the longer.

2. An electronic converter comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; each group of tubes having a common output-terminal; and control-circuit excitation-means for exciting the control-circuits of the respective tubes, said control-circuit excitation-means including means for producing a control-voltage modulation at the input-frequency, and means for producing a control-voltage modulation at a modulator-frequency which is less than said input-frequency, said modulator-frequency control-circuit excitation-means comprising the combination of a common cathode-circuit, a direct-current negative bias-voltage source having its positive terminal connected to said common cathode-circuit, and a single-pole rotating-commutator bias-reducing means for periodically reducing said negative bias.

3. An electronic converter comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; each group of tubes having a common output terminal; and control-circuit excitation-means for exciting the control-circuits of the respective tubes, said control-circuit excitation-means including means for producing a control-voltage modulation at the input-frequency, and means for producing a control-voltage modulation at a modulator-frequency which is less than said input-frequency, said modulator-frequency control-circuit excitation-means comprising the combination of a common cathode-circuit, a direct current negative bias-voltage source having its positive terminal connected to said common cathode-circuit, and a single-pole rotating commutator having a separate brush for each group of converter-tubes, and a potentiometer connected between each brush and the positive bias-source terminal for periodically reducing said negative bias.

4. An electronic converter comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; each group of tubes having a common output-terminal; and control-circuit excitation-means for exciting the control-circuits of the respective tubes, said control-circuit excitation-means including means for producing a control-voltage modulation at the input-frequency, and means for producing a control-voltage modulation at a modulator frequency which is less than said input-frequency, said modulator-frequency control-circuit excitation-means comprising the combination of a common cathode-circuit, a direct-current negative bias-voltage source having its positive terminal connected to said common cathode-circuit, a direct-current positive bias-voltage source having its negative terminal connected to the negative terminal of said negative bias-voltage source, and a single-pole rotating-commutator bias-reducing means, in series with said positive bias-voltage source, for periodically reducing said negative bias.

5. An electronic converter comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; each group of tubes having a common output-terminal; and control-circuit excitation-means for exciting the control-circuits of the respective tubes, said control-circuit excitation-means including means for producing a control-voltage modulation at the input-frequency, and means for producing a control-voltage modulator at a modulator frequency which is less than said input-frequency, said modulator-frequency control-circuit excitation-means comprising the combination of a common cathode-circuit, a direct-current negative bias-voltage source having its positive terminal connected to said common cathode-circuit, a direct-current auxiliary bias-voltage source having an intermediate tap connected to the negative terminal of said negative bias-voltage source, and a single-pole rotating-commutator bias-changing means having two commutator-segments for each 360 electrical degrees, and having two slip-rings for connecting said commutator-segments to the respective terminals of said auxiliary bias-voltage source.

6. An electronic converter comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; each group of tubes having a common output-terminal; a midtapped winding joining the output-terminals of the postive and negative groups of a pair of groups; and a plurality of control-circuit voltage-sources for exciting the control-circuits of the respective tubes, said control-circuit voltage-sources serially including two input-frequency voltage-sources of different voltages individual to each tube, the lower-voltage input-frequency source having positive voltage-waves timed suitably for initiating a rectifying operation of the tube to which it is applied, the higher-voltage input-frequency source having positive voltage-waves timed suitably for initiating an inverting operation of the tube to which it is applied, at least one of said lower-voltage or higher-voltage input-frequency control-circuit waves being peaked, and tube-controlling means including a common modulator-frequency variable-voltage means, common to all of the tubes of a group, each modulator-frequency tube-controlling means alternating between a tube-controlling voltage such that the positive voltage-waves of both the rectifying and inverting input-frequency control-circuit sources are permitted to fire their respective tubes if the anodes are sufficiently positive with respect to the cathodes, and a tube-controlling voltage which blocks the rectifying, but not the inverting, input-frequency control-circuit sources from firing their respective tubes, at a modulator-frequency which is different from said input-frequency, the modulator-frequency voltage-variation for the positive group of a pair of groups being substantially in the middle of a firing-permitting voltage-condition when the modulator-frequency voltage-variation for the negative group of said pair of groups is substantially in the middle of a blocking condition, the firing-permitting periods being substantially shorter than the blocking periods.

7. An electronic converter comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; each group of tubes having a common output-terminal; a midtapped winding joining the output-terminals of the positive and negative groups of a pair of groups; and a plurality of control-circuit voltage-sources for exciting the control-circuits of the respective tubes, said control-circuit voltage-sources serially including two input-frequency voltage-sources of different voltages individual to each tube, the lower-voltage input-frequency source having positive voltage-waves timed suitably for initiating a rectifying operation of the tube to which it is applied, the higher-voltage input-frequency source having positive voltage-waves timed suitably for initiating an inverting operation of the tube to which it is applied, at least one of said lower-voltage or higher-voltage input-frequency control-circuit waves being peaked, and said control-circuit voltage-sources further serially including a common modulator-frequency variable-bias means, common to all of the tubes of a group, each variable-bias means alternating between a bias of such strength that the positive voltage-waves or both the rectifying and inverting input-frequency control-circuit sources make their respective control-circuits reach the critical tube-firing control-voltage, and a more negative bias which blocks the rectifying, but not the inverting, input-frequency control-circuit sources from firing their respective tubes, at a modulator-frequency which is different from said input-frequency, the modulator-frequency bias-variation for the positive group of a pair of groups being substantialy in the middle of a firing-permitting voltage-condition when the modulator-frequency voltage-variation for the negative group of said pair of groups is substantially in the middle of a blocking condition, the firing-permitting periods being substantially shorter than the blocking periods.

8. The invention as defined in claim 6, characterized by said modulator-frequency being lower than said input-frequency.

9. The invention as defined in claim 7, characterized by said modulator-frequency being lower than said input-frequency.

10. The invention as defined in claim 6, characterized by said modulator-frequency variable-voltage means having a substantially square-topped wave-form.

11. The invention as defined in claim 7, characterized by said modulator-frequency variable-bias means having a substantially square-topped wave-form.

12. An electronic frequency-changer comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; each group of tubes having a common output-terminal; a midtapped winding joining the output-terminals of the positive and negative groups of a pair of groups; a modulator-frequency output-circuit operatively associated with said midtapped winding; and a plurality of control-circuit voltage-sources for exciting the control-circuits of the respective tubes, said control-circuit voltage-sources serially including two input frequency voltage-sources of different voltages individual to each tube, the lower-voltage input-frequency source having positive voltage-waves timed suitably for initiating a rectifying operation of the tube to which it is applied, the higher-voltage input-frequency source having positive voltage-waves timed suitably for initiating an inverting operation of the tube to which it is applied, at least one of said lower-voltage or higher-voltage input-frequency control-circuit waves being peaked, and tube-controlling means including a common modulator-frequency variable-voltage means, common to all of the tubes of a group, each modulator-frequency tube-controlling means alternating between a tube-controlling voltage such that the positive voltage-waves of both the rectifying and inverting input-frequency control-circuit sources are permitted to fire their respective tubes if the anodes are sufficiently positive with respect to the cathodes, and a tube-controlling voltage which blocks the rectifying, but not the inverting, input-frequency control-circuit sources from firing their respective tubes, at a modulator-frequency which is different from said input-frequency, the modulator-frequency voltage-variation for the positive group of a pair of groups being substantially in the middle of a firing-permitting voltage-condition when the modulator-frequency voltage-variation for the negative group of said pair of groups is substantially in the middle of a blocking condition, the firing-permitting periods being substantially shorter than the blocking periods.

13. An electronic frequency-changer comprising one or more pairs of positive and negative groups of tubes, each tube having a control circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; each group of tubes having a common output-terminal; a midtapped winding joining the output-terminals of the positive and negative groups of a pair of groups; a modulator-frequency output circuit operatively associated with said midtapped winding; and a plurality of control-circuit voltage-sources for exciting the control-circuits of the respective tubes, said control-circuit voltage-sources serially including two input-frequency voltage-sources of different voltages individual to each tube, the lower-voltage input-frequency source having positive voltage-waves timed suitably for initiating a rectifying operation of the tube to which it is applied, the higher-voltage input-frequency source having positive voltage-waves timed suitably for initiating an inverting operation of the tube to which it is applied, at least one of said lower-voltage or higher-voltage input-frequency control-circuit waves being peaked, and said control-circuit voltage-sources further serially including a common modulator-frequency variable-bias means, common to all of the tubes of a group, each variable-bias means alternating between a bias of such strength that the positive voltage-waves of both the rectifying and inverting input-frequency control-circuit sources make their respective control-circuits reach the critical tube-firing control-voltage, and a more negative bias which blocks the rectifying, but not the inverting, input-frequency control-circuit sources from firing their respective tubes, at a modulator-frequency which is different from said input-frequency, the modulator-frequency bias variation for the positive group of a pair of groups being substantially in the middle of a firing-permitting voltage-condition when the modulator-frequency voltage-variation for the negative group of said pair of groups is substantially in the middle of a blocking condition, the firing-permitting periods being substantially shorter than the blocking periods.

14. The invention as defined in claim 12, characterized by said modulator-frequency being lower than said input-frequency.

15. The invention as defined in claim 13, characterized by said modulator-frequency being lower than said input-frequency.

16. The invention as defined in claim 7, characterized by said common modulator-frequency variable-bias means being common to all of the tubes of all of the groups, and comprising a common cathode-circuit, a direct-current negative bias-voltage source having its positive terminal connected to said common cathode-circuit, and a single-pole rotating commutator biasing-reducing means for periodically reducing said negative bias to produce the modulator-frequency periods during which the control-circuits of both the positive and negative groups of a pair of groups attain a firing-permitting bias-voltage during both the rectifying and inverting input-frequency operating-times.

17. The invention as defined in claim 7, characterized by said common modulator-frequency variable-bias means being common to all of the tubes of all of the groups, and comprising a common cathode-circuit, a direct-current negative bias-voltage source having its positive terminal connected to said common cathode-circuit, a single-pole rotating-commutator bias-reducing means for periodically reducing said negative bias to produce the modulator-frequency periods during which the control circuits of both the positive and negative groups of a pair of groups attain a firing-permitting bias-voltage during both the rectifying and inverting input-frequency operating-times, and circuit-means for at times cutting out said bias-reducing means so as to block the possibility of rectifying operation without blocking the possibility of inverting operation of any of the tubes.

18. The invention as defined in claim 7, characterized by said common modulator-frequency variable-bias means being common to all of the tubes of all of the groups, and comprising a common cathode-circuit, a direct-current negative bias-voltage source having its positive terminal connected to said common cathode-circuit, and a single-pole rotating commutator having a separate brush for each group of converter-tubes, and a potentiometer connected between each brush and the positive bias-source terminal for periodically reducing said negative bias to produce the modulator-frequency periods during which the control-circuits of both the positive and negative groups of a pair of groups attain a firing-permitting bias-voltage during both the rectifying and inverting input-frequency operating-times.

19. The invention as defined in claim 7, characterized by said common modulator-frequency variable-bias means being common to all of the tubes of all of the groups, and comprising a common cathode-circuit, a direct-current negative bias-voltage source having its positive terminal connected to said common cathode-circuit, a direct-current positive bias-voltage source having its negative terminal connected to the negative terminal of said negative bias-voltage source, and a single-pole rotating-commutator bias-reducing means, in series with said positive bias-voltage source, for periodically reducing said negative bias to produce the modulator-frequency periods during which the control-circuits of both the positive and negative groups of a pair of groups attain a firing-permitting bias-voltage during both the rectifying and inverting input-frequency operating-times.

20. The invention as defined in claim 7, characterized by said common modulator-frequency variable-bias means being common to all of the tubes of all of the groups, and comprising a common cathode-circuit, a direct-current negative bias-voltage source having its positive terminal connected to said common cathode-circuit, a direct-current auxiliary bias-voltage source having an intermediate tap connected to the negative terminal of said negative bias-voltage source, and a single-pole rotating-commutator bias-changing means having two commutator-segments for each 360 electrical degrees, and having two slip-rings for connecting said commutator-segments to the respective terminals of said auxiliary bias-voltage source.

JOHN L. BOYER.
CHARLES GORDON HAGENSICK.